United States Patent [19]

Zwillich

[11] 4,379,945
[45] Apr. 12, 1983

[54] ADJUSTABLE INSULATOR ATTACHMENT FOR ISOLATED PHASE BUS SWITCH

[75] Inventor: Alexander Zwillich, Pittsburgh, Pa.

[73] Assignee: Westinghouse Electric Corp., Pittsburgh, Pa.

[21] Appl. No.: 277,462

[22] Filed: Jun. 25, 1981

[51] Int. Cl.³ .................................. H02G 5/06
[52] U.S. Cl. ........................ 174/99 B; 174/161 R
[58] Field of Search .............. 174/99 B, 99 E, 149 B, 174/161 R

[56] References Cited

U.S. PATENT DOCUMENTS

| | | | |
|---|---|---|---|
| 2,396,131 | 3/1946 | Scott, Jr. ........................ | 174/99 B |
| 2,889,396 | 6/1959 | Boden et al. ................... | 174/161 R |
| 3,073,891 | 1/1963 | Barengoltz ..................... | 174/161 R |
| 4,339,635 | 7/1982 | Zwillich et al. ................. | 200/48 R |

*Primary Examiner*—Laramie E. Askin
*Attorney, Agent, or Firm*—Robert E. Converse, Jr.

[57] ABSTRACT

Isolated phase bus duct includes apparatus for adjustably attaching an insulator to the inner surface of a disconnecting switch enclosure to accommodate positional and angular tolerances. The apparatus includes a base member tangential to the surface of the enclosure having a first circular aperture with angled sidewalls. A first circular positioning plate having an angled outer sidewall is seated in the first aperture and includes a second circular aperture non-concentric with the first plate. The second aperture also includes angled side walls and has mounted therein a second circular positioning plate. The second plate has a third circular aperture therein which has angled sidewalls and is non-concentric with the second plate. Seated in the third aperture is a ball plate adapted to be bolted to an insulator. To attach the insulator to the enclosure, the first and second positioning plates and the ball plate are rotated relative to each other and to the enclosure until the ball plate lines up with the insulator. Bolts are then inserted through the ball plate and tightly fastened into tapped holes in a bracket attached to the insulator, thereby fixedly attaching the insulator to the enclosure.

7 Claims, 5 Drawing Figures

ADJUSTABLE INSULATOR ATTACHMENT FOR ISOLATED PHASE BUS SWITCH

BACKGROUND OF THE INVENTION

1. Field of the Invention

The invention relates generally to electrical apparatus and, more particularly, to insulators for high voltage, high current isolated phase bus disconnect switches.

2. Description of the Prior Art

Disconnect switches for isolated phase bus duct are used to electrically isolate components such as generators, circuit breakers, and step-up transformers. Such a switch is shown in copending application Ser. No. 219,716, filed Dec. 24, 1980 by Alexander Zwillich et al. (now U.S. Pat. No. 4,339,635) and assigned to the assignee of the present invention. This switch employs a conductive outer enclosure at ground potential and an inner conductor coaxially disposed within the enclosure. The enclosure and inner conductor are adapted to be connected to corresponding enclosures and inner conductors of isolated phase bus duct. The inner conductor consists of two fixed components and a telescopically movable contact operable by a mechanism to open and close the circuit. The inner conductor and the movable contact are supported and positioned within the outer enclosure by a plurality of porcelain insulators connected in tension between the enclosure and inner conductor like spokes of a bicycle wheel.

The insulators in the prior art were connected between the enclosure and center conductor by bolting brackets to each end of the insulator, and then welding the brackets to the enclosure and inner conductor, respectively. This created difficulties during assembly of the switch, since the attachment points on the conductors, the enclosure, and the insulators themselves are manufactured to large location and angular tolerances. Thus, extensive fitting and rework was required during assembly in order to provide the required conductor alignment to allow the movable telescoping conductor section to properly mate in both open and closed circuit positions. Assembly using prior art methods of insulator attachment is thus costly and time consuming, requiring a large amount of skilled labor. Furthermore, replacement of an insulator due to damage is awkward in the factory and extremely difficult in the field.

It would therefore be desirable to provide apparatus for attaching insulators between the enclosure and the inner conductor of isophase bus duct and associated disconnect switches which would permit insulator attachment and replacement to be easily made without extensive reworking, both in the shop and in the field.

SUMMARY OF THE INVENTION

In accordance with a preferred embodiment of the present invention, apparatus is provided for attaching an insulator to the enclosure of isolated phase bus duct. The apparatus includes a base member attached to the enclosure which has a mounting portion substantially tangential to the surface of the enclosure. A first circular aperture extends through the mounting portion. A first circular positioning plate is provided which includes means for supporting this plate within the first aperture. The first positioning plate also includes a second circular aperture therethrough which is nonconcentric with the plate itself. A second circular positioning plate includes means for supporting itself within the second aperture and is equipped with a third circular aperture located non-concentrically within the second plate itself. An insulator attachment member includes means for eccentrically supporting itself upon the wall defining the aperture in the second positioning plate and for fixedly attaching an insulator to the attachment member. The apparatus further includes means operable between disengaged and engaged conditions for permitting rotation of the first and second positioning plates when in the disengaged condition and for fixedly locating the first positioning plate, the second positioning plate, and the fixed attachment member relative to the electrical conductor when in the engaged condition. Thus, rotation of the first and second positioning plates is operable to adjust the position of the insulator relative to the electrical conductor. The attachment member is provided with a spherical surface, allowing adjustment of the insulator angle relative to the conductor surface.

DESCRIPTION OF THE PREFERRED EMBODIMENT

Figure 1:
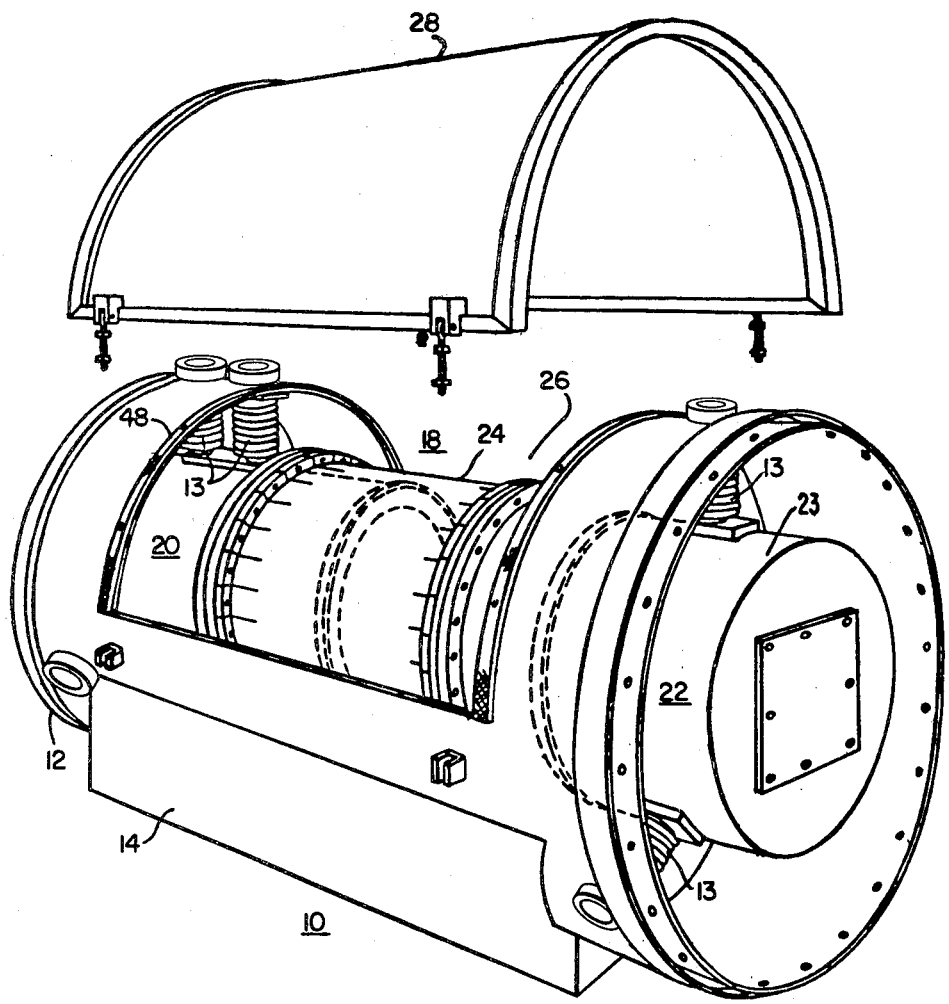
FIG. 1 is a perspective view of an isolated phase bus disconnect switch which includes an enclosure, an inner conductor, and insulators all constructed according to the principles of the present invention.
Figure 2:
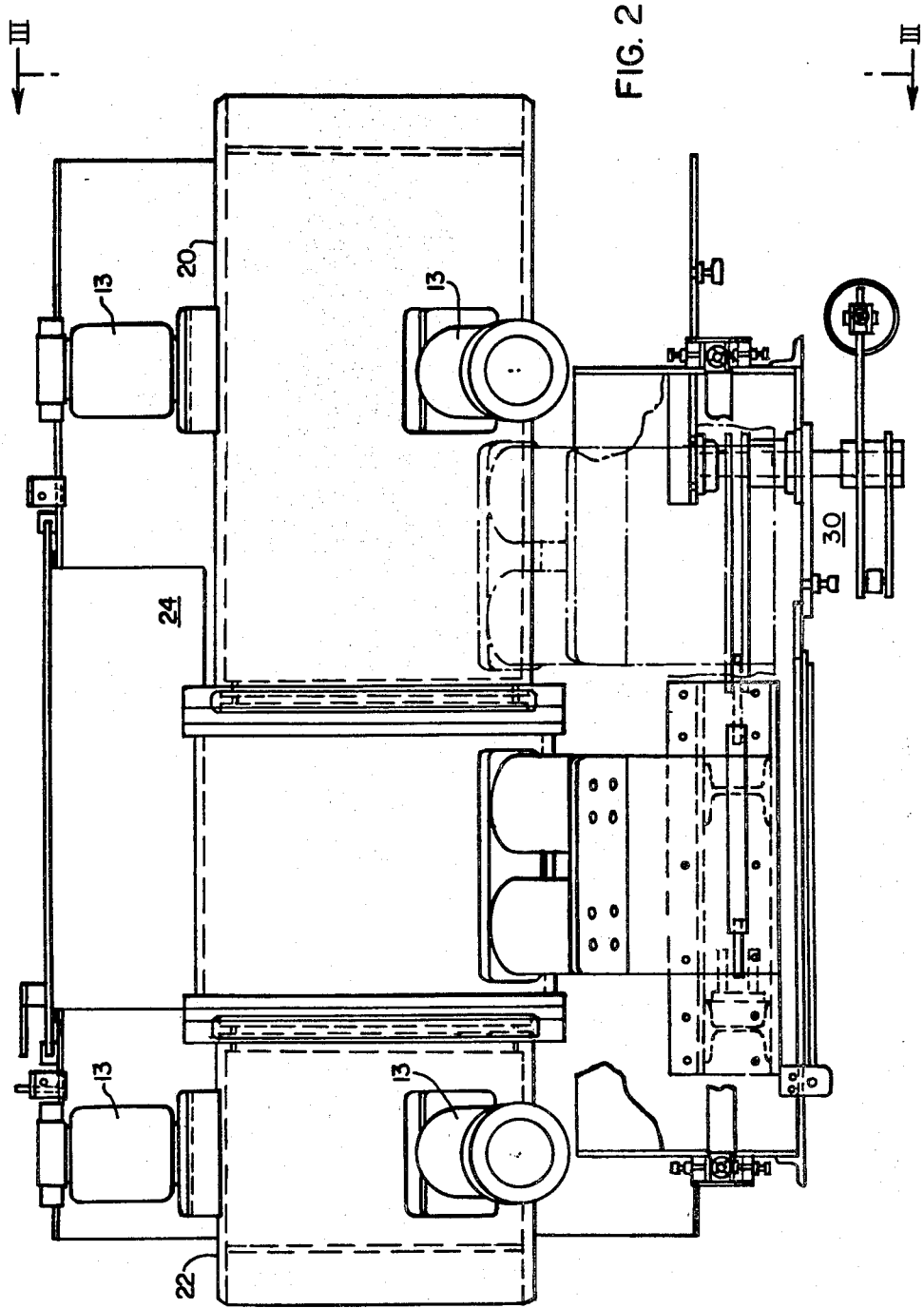
FIG. 2 is a longitudinal cross-sectional view of the switch of FIG. 1.
Figure 3:
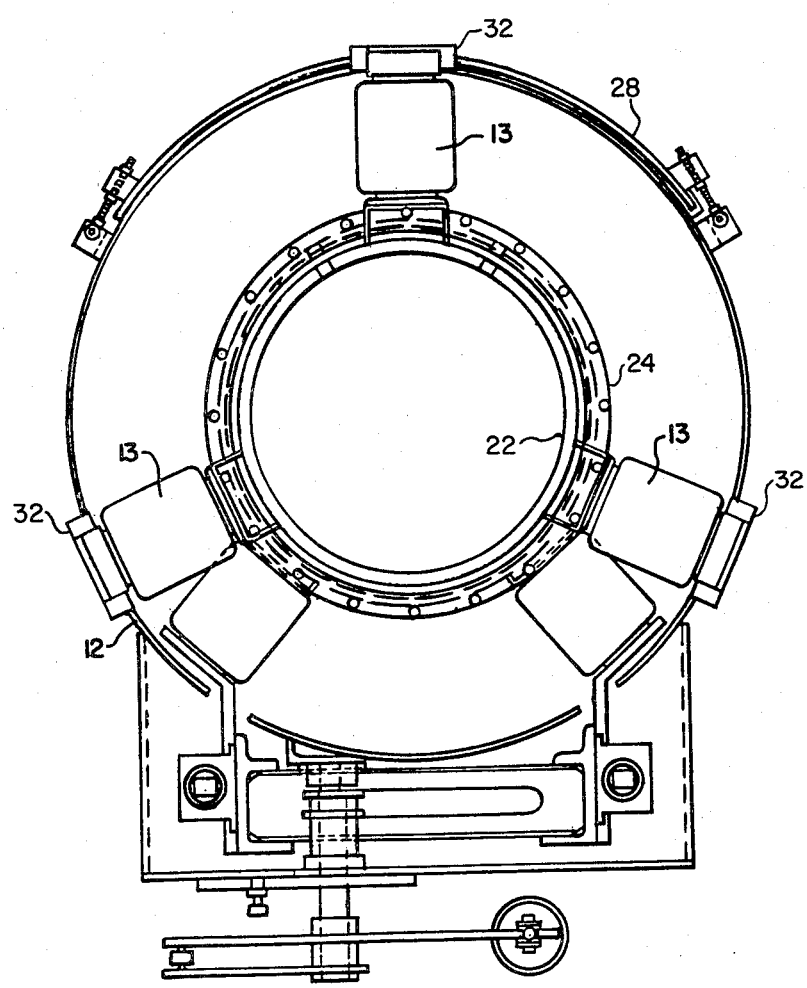
FIG. 3 is a transverse cross-sectional view taken along the line III—III of FIG. 2.

Referring now to the drawings, in which corresponding reference characters refer to corresponding members, there is shown in FIG. 1 a perspective view of a disconnect switch 10 for isolated phase bus duct which embodies the principles of the invention. The switch 10 comprises a generally cylindrical enclosure 12 constructed of aluminum. The enclosure 12 is welded to support plates 14 which are in turn attached to a structural supporting framework not shown. The switch 10 also comprises a center conductor assembly 18 coaxially mounted within the enclosure 12 and electrically insulated therefrom by insulators 13. The center conductor assembly 18 comprises first and second fixed center conductor members 20 and 22 adapted for electrical connection to the center conductor of adjacent isolated phase bus duct, and a telescoping sleeve assembly 24 which is axially movable to electrically connect and disconnect the first and second fixed conductor members. As can be seen, the switch 10 includes a maintenance and inspection port 26 having a removable access cover 28. An operating mechanism 30 (FIG. 2) is provided to operate the telescoping sleeve assembly 24 from a closed position as shown in FIG. 2 axially along the outside of the conductor 20 to an open position as shown in FIG. 1. The operating mechanism is described more fully in the aforementioned copending application Ser. No. 219,716 (now U.S. Pat. No. 4,339,635).

Figure 4:
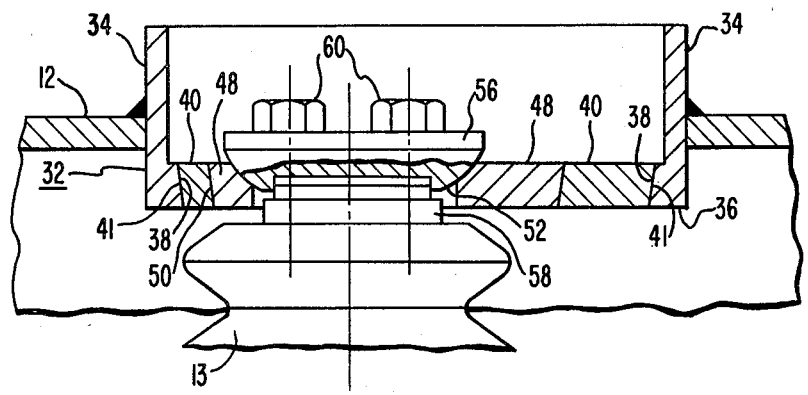
FIG. 4 is a detail cross-sectional view showing the means of attaching an insulator and enclosure of the switch of FIGS. 1 through 3.

A detailed view of the point of attachment between one of the insulators 13 and the enclosure 12 is shown more clearly in FIG. 4. As can be seen, a transition cup member 32 is welded to the wall at a hole in the enclosure 12. The transition cup includes a pair of side members 34 and a base member 36, with a circular aperture extending through the base member. As can be seen in FIG. 4, the sidewalls 38 of the aperture of the base member 36 are angled such that the diameter of the base member aperture facing the outside of the housing (toward the top in FIG. 4) is greater than the diameter of the base member aperture which faces the interior of the enclosure (toward the bottom in FIG. 4). The sidewalls of the circular aperture in the base member 36 thus form a conical bearing seat to cooperate with the sidewall 41 of a first positioning plate 40 which forms a conical bearing surface.

Seated within the circular aperture of the base member 36 is the first circular positioning plate 40, the outer sidewalls of which are inclined at the same angle as the sidewalls 38 of the aperture of the base member 36. Since the mean diameter of the first positioning plate is approximately equal to the mean circular aperture in the base member 36, it can be seen that the first positioning plate 40 is securely seated within the aperture of the base member 36 in essentially the same plane as the base member 36.

Figure 5:
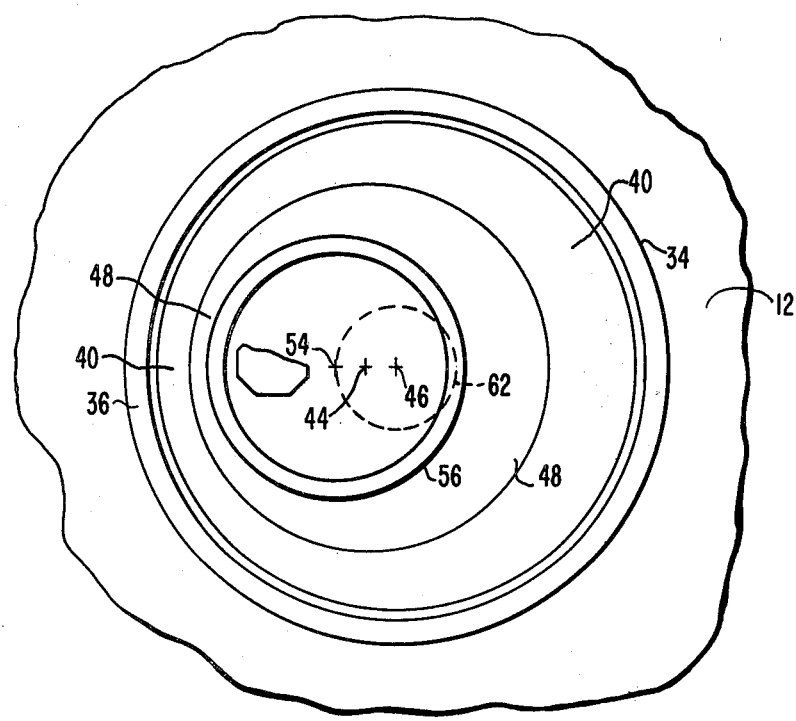
FIG. 5 is a top plan view of the insulator attachment point shown in FIG. 4.

As can be seen most clearly in FIG. 5, the first circular positioning plate 40 also includes a second circular aperture, the center 44 of which is not coincident with the center 46 of the first positioning plate 40.

Seated within the aperture of the first positioning plate 40 is a second circular positioning plate 48. As can be seen in FIG. 4, the angled sidewalls 50 of the second circular positioning plate 48 form a conical bearing surface to cooperate with the angled inner sidewalls of the aperture in the first positioning plate 40 which forms a conical bearing seat, in a manner similar to that formed between the base member 36 and the first positioning plate 40.

The second positioning plate 48 also includes a third circular aperture, the center 54 of which is noncoincident with the center 44 of the second positioning plate. Seated within the third aperture is an insulator attachment member, or ball plate, 56. The ball plate 56 is formed with an essentially spherical surface which cooperates with a conical surface on the interior walls of the third circular aperture 52. As can be seen in FIG. 4, the ball plate 56 includes a recess for receiving a circular attachment bracket, or spigot, 58 which is fixedly attached to the porcelain insulator 13. Appropriate fasteners are provided, such as the two bolts 60 which extend through the ball plate 56 and are received by and threaded into corresponding tapped holes in the spigot 58.

The assembly and adjustment of the center conductor 18 thus can be accomplished as follows. The conductor members 20 and 22 with attached insulators are positioned within the enclosure 12 and held there with temporary fixtures, not shown. At attachment points corresponding to each of the insulators 13, the two positioning plates 40 and 48 are installed into the transition cup 32 and rotated within the cup and relative to each other until the eccentric aperture in the second position plate 48 is lined up with the end of the insulator 13 which is to be attached to the enclosure 12. Next, the ball plate 56 is installed so that its recess engages the spigot 58 of the insulator 13, and the spherical surface engages the corresponding conical bearing surface in the circular aperture of the second positioning plate 48. The attachment of the insulators is then accomplished by threading the insulator bolts 60 into the corresponding tapped holes in the insulator 13 and tightening them to the torque required to provide the necessary pre-load force in tension. The relative position of the first and second positioning plates 40 and 48 and of the ball plate 56 is thus fixed.

It can be appreciated that by making the distance of center 46 from center 44 equal to the distance of center 54 from center 44 and by rotating (with the bolts 60 removed) the first and second positioning plates relative to each other and within the aperture of the base member of the transition cup, the center 54 of the circular aperture within the second positioning plate 48 can be placed anywhere within the circular area of a radius equal to the sum of center distances 46 from 44 and 54 from 44 shown by the broken circular line 62. The attachment point for the insulator 13 can thus be adjusted over a distance within a plane tangential to the surface of the enclosure 12 sufficient to obtain the required degree of conductor alignment.

Furthermore, although the ball plate configuration is not required to adjust the insulator attachment location, it can be seen that by providing the ball plate with a spherical surface to mate with the corresponding bearing seat of the sidewall of the third aperture, it is not necessary that the insulator be normal to the surface of the enclosure. Instead, a large variation in angular position of the insulator can be successfully accommodated.

Transverse force on the center conductor 18 is transmitted through the insulators 13 as an axial force in tension. This force is resisted by the bolts 60 bearing on the ball plate 56, and the ball plate spherical surface bearing upon the conical seat surface of the second positioning plate 48, which in turn transmits the force through the conical seat surfaces of the first positioning plate which in turn transmits the force to the transition cup 32 and hence to the enclosure 12.

Axial force on the conductor 18 is transmitted as shear force to the insulator 13 which in turn bears via the spigot 58 on the ball plate 56 and hence to the positioning plates 40 and 48 and transition cup 32 in an orthogonal direction to the previously defined axial tension force.

Torques due to the shear forces acting tangentially on the conical surfaces of the positioning plates 40 and 48 are resisted by friction forces due to the axial pre-load tension force on the insulators 13, which in turn acts upon the conical surfaces of the positioning plates and transition cup.

The insulator 13 could be supported upon the second positioning plate, and the first and second positioning plates supported by the transition cup through other methods. However, the disclosed construction has been shown to be particularly effective for this particular application.

In summary, it can be seen that the present invention provides isolated phase bus duct apparatus for insulatingly attaching a cylindrical center conductor concentrically within a cylindrical housing in a manner which provides ease of adjustment, both in initial assembly and in subsequent field modifications and maintenance procedures.

I claim:

1. Apparatus for attaching an insulator to an electrical conductor comprising:
    a base member attached to the electrical conductor, said base member including a mounting portion substantially tangential to the surface of the conductor and means defining a first circular aperture through said mounting portion;

a first circular positioning plate comprising means for supporting said first positioning plate within said first aperture and means defining a second circular aperture through said first positioning plate and nonconcentric therewith;

a second circular positioning plate comprising means for supporting said second positioning plate within said second aperture; an insulator attachment member; and means for eccentrically supporting said attachment member upon said second positioning plate;

means for fixedly attaching said attachment member to an insulator; and means operable between disengaged and engaged conditions for permitting rotation of said first and said second positioning plates when in the disengaged condition, and for fixedly locating said first positioning plate, said second positioning plate, and said attachment member relative to the electrical conductor when in the engaged condition;

whereby rotation of said first and second positioning plates is operable to adjust the position of an insulator relative to the electrical conductor within planes tangential to the surface of the electrical conductor.

2. Apparatus as recited in claim 1 wherein:

said means for supporting said first positioning plate comprises an angled sidewall surrounding said first positioning plate to define a first conical bearing surface and said means defining said first circular aperture comprises an angled sidewall defining a first conical bearing seat for receiving said first conical bearing surface of said first positioning plate;

said means for supporting said second positioning plate comprises an angled sidewall surrounding said second positioning plate to define a second conical bearing surface and said means defining said second circular aperture comprises an angled sidewall defining a second conical bearing seat for receiving said second conical bearing surface of said second positioning plate;

said attachment member comprises a sidewall forming a curved bearing surface; and said means for supporting said attachment member comprises a sidewall defining a third circular aperture through said second positioning plate and forming a third conical bearing seat for receiving said curved bearing surface.

3. Apparatus as recited in claim 2 wherein said curved bearing surface is a substantially spherical surface.

4. Apparatus as recited in claim 3 wherein said means for fixedly attaching said attachment member to an insulator comprises a bracket adapted to be fixedly attached to an insulator, said bracket comprising means for receiving a fastener; and said means for permitting rotation of said first and second positioning plates comprises fastener means extending through said attachment member for cooperating with said receiving means.

5. Apparatus for attaching an insulator to a cylindrical electrical conductor, comprising:

a base member attached to the electrical conductor and including a mounting portion tangential to the surface of the conductor, said mounting portion comprising a first angled sidewall defining a first circular aperture therethrough, and forming a first conical bearing seat;

a first circular positioning plate defined by a second angled sidewall, said second sidewall forming a first conical bearing surface seated in said first bearing seat, said first positioning plate comprising a third, inner, angled sidewall defining a second circular aperture nonconcentric with said first positioning plate, said third sidewall forming a second conical bearing seat;

a second circular positioning plate defined by a fourth angled sidewall, said fourth sidewall forming a second conical bearing surface seated in said second bearing seat, said second positioning plate comprising a fifth, inner, angled sidewall defining a third circular aperture non-concentric with said second positioning plate, said fifth sidewall forming a third conical bearing seat;

a ball plate having a spherical bearing surface seated in said third bearing set and comprising an aperture therethrough;

an attachment bracket adapted to be fixedly attached to an insulator, said bracket comprising a tapped hole; and a bolt extending through said ball plate aperture and adapted to be received by said tapped hole;

said ball plate, said first positioning plate, and said second positioning plate being rotatable relative to each other and to said mounting portion when said bolt is loosely threaded into said tapped hole, whereby the position and angular attitude of an insulator attached to said attachment bracket can be adjusted relative to the electrical conductor;

tightening of said bolt into said tapped hole being operable to fix the position and angular attitude of an insulator attached to said attachment bracket relative to the cylindrical conductor.

6. Isolated phase bus apparatus, comprising:

a cylindrical outer conductive enclosure; a cylindrical inner conductor coaxially disposed within said enclosure;

a plurality of insulators attached to said inner conductor and radially extending therefrom; and a plurality of adjustable attachment assemblies, each of said assemblies comprising:

a base member attached to said enclosure and comprising a mounting portion perpendicular to the radius of said enclosure, said mounting portion comprising a first angled sidewall defining a first circular aperture therethrough, and forming a first conical bearing seat;

a first circular positioning plate defined by a second angled sidewall, said second sidewall forming a first conical bearing surface seated in said first bearing seat, said first positioning plate comprising a third, inner, angled sidewall defining a second circular aperture non-concentric with said first positioning plate, said third sidewall forming a second conical bearing seat;

a second circular positioning plate defined by a fourth angled sidewall, said fourth sidewall forming a second conical bearing surface seated in said second bearing seat, said second positioning plate comprising a fifth, inner, angled sidewall defining a third circular aperture non-concentric with said second positioning plate, said fifth sidewall forming a third conical bearing seat;

a ball plate having a spherical bearing surface seated in said third bearing seat and comprising an aperture therethrough;

an attachment bracket fixedly attached to an insulator, said bracket comprising a plurality of tapped holes; and bolts extending through said ball plate aperture and received by said tapped holes;

said ball plate, said first positioning plate, and said second positioning plate being rotatable relative to each other and to said mounting portion when said bolts are loosely threaded into said tapped holes, whereby the position and angular attitude of said associated insulator can be adjustably established relative to said enclosure;

tightening of said bolts into said tapped holes being operable to fix the positions of said associated insulators relative to said enclosure and to establish a tension force on said insulators.

7. Isolated phase bus apparatus, comprising:

a cylindrical outer conductive enclosure;

a cylindrical inner conductor coaxially disposed within said enclosure;

a plurality of insulators attached to said inner conductor and radially extending therefrom; and a plurality of adjustable attachment assemblies comprising:

a base member attached to the enclosure, said base member including a mounting portion substantially tangential to the surface of the enclosure and means defining a first circular aperture through said mounting portion;

a first circular positioning plate comprising means for supporting said first positioning plate within said first aperture and means defining a second circular aperture through said first positioning plate and nonconcentric therewith;

a second circular positioning plate comprising means for supporting said second positioning plate within said second aperture; an insulator attachment member; and means for eccentrically supporting said attachment member upon said second positioning plate;

means for fixedly attaching said attachment member to an insulator; and means operable between disengaged and engaged conditions for permitting rotation of said first and said second positioning plates when in the disengaged condition; and for fixedly locating said first positioning plate, said second positioning plate, and said attachment member relative to the enclosure when in the engaged condition;

whereby rotation of said first and second positioning plates is operable to adjustably establish the position of the insulator relative to the enclosure within planes tangential to the surface of the enclosure.

* * * * *